United States Patent
Watkins et al.

(10) Patent No.: US 6,865,598 B2
(45) Date of Patent: Mar. 8, 2005

(54) UTILIZATION OF UNUSED DISK SPACE ON NETWORKED COMPUTERS

(75) Inventors: Mark Robert Watkins, Bristol (GB); Graeme Hogg, Bristol (GB); Alastair Michael Slater, Malmesbury (GB); Ian Stuart Duncan, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 614 days.

(21) Appl. No.: 09/875,950

(22) Filed: Jun. 8, 2001

(65) Prior Publication Data

US 2002/0046360 A1 Apr. 18, 2002

(51) Int. Cl.⁷ .............................................. G06F 13/14
(52) U.S. Cl. ...................................................... 709/216
(58) Field of Search ................................ 709/215, 216, 709/218; 711/162

(56) References Cited

U.S. PATENT DOCUMENTS 5,586,310 A    12/1996  Sharman
6,421,687 B1 *  7/2002  Klostermann ............... 707/202
6,711,594 B2 *  3/2004  Yano et al. .................. 707/204

FOREIGN PATENT DOCUMENTS

EP    A-854423      7/1998
WO    WO 96/37837  11/1996

* cited by examiner

Primary Examiner—Kevin L. Ellis

(57) ABSTRACT

A plurality of computers in a network each have a processor and a non-volatile data storage device such as a hard disk, a raid array, or the like. Each data storage device is divided into a first data storage area and a second data storage area. The first data storage area is reserved for use by at least one processor to which it is assigned, whereas the second data storage area is hidden from use by the file system of the computer, and is used to store replicated data of other ones of the plurality of computer entities. In the event of failure of any one of the data storage devices, data can be recovered from the second data storage areas of the other data storage devices.

24 Claims, 18 Drawing Sheets

Drives selected:

| Computer | Drives | Size | Group |
|---|---|---|---|
| Jane | 1 | 9 GB | 1,2,3,6,8 DFS |
| Accounts | 2 | 4 GB | 1,2,3,6,8 DFS |
| Sales 1 | 3 | 4 GB | 1,2,3,6,8 DFS |
|  | 4 | 8 GB | 4,5,7 |
| Sales 2 | 5 | 8 GB | 4,5,7 |
| Mandy | 6 | 4 GB | 1,2,3,6,8 DFS |
|  | 7 | 8 GB | 4,5,7 |
| Server | 8 RAID | 20 GB | 1,2,3,6,8 DFS |

Fig. 14

UTILIZATION OF UNUSED DISK SPACE ON NETWORKED COMPUTERS

FIELD OF THE INVENTION

The present invention relates to the field of data storage in computers, and particularly, although not exclusively, to a plurality of networked computers storing data on internal non-volatile memory devices.

BACKGROUND TO THE INVENTION

Conventionally, corporations using a plurality of computers, for example a plurality of networked personal computers (PCs) or Macintosh® type computers, make backup copies of data on a networked system to guard against loss of data caused by computer or disk drive failure, or by loss of computers or disk drives. There are many known types of back up hardware systems, and conventionally these fall into 3 broad categories termed on-line, near-line and off-line backup systems.

On-line backup systems are aimed at backing up data lost due to failure of parts of computer networks, where the backup procedure can be initiated almost immediately, once the loss of data is discovered. On-line backup systems form an integral part of a computer network, and includes such systems as a redundant server which mirrors the data in a main server, and which is connected over a same local area network as the main server. On-line systems, particularly for small companies, do not protect against catastrophic events such as a fire destroying all the computer equipment, or theft of all computer equipment in a network. However, they provide relatively fast recovery times from equipment failure.

Near-line systems involve storage of data on devices having lower response times than on-line systems in the event of data loss. Typically, a near-line system may comprise a CD ROM cassette system, or a tape-spool system, where the CD ROMs and tapes are removable from a drive. Large volumes of CD ROMs or tapes may be stored within a same building as the computer network, and which are readily available in the event of data loss.

Off-line systems include backup to data storage devices which are removed from the physical location of the network, for example stored a few miles away. In the event of a catastrophic failure of the network, e.g. theft of all computers, or destruction of all computers by fire, off-line systems provide the means to recover data. Off-line systems typically have delay times in restoring backup data which are greater than near-line systems.

There are a wide variety of legacy backup systems in use, however many corporations run computer networks which, in practice, have shortfalls in backup procedures and which leave companies vulnerable to loss of data. Many corporations are without on-line, near-line or off-line backup facilities, or have gaps in their backup coverage having only on-line or off-line and no near-line facilities, or on-line facilities only with no off-line facilities for example.

In the PC market, recently the data capacity of disk drives sold within PCs has increased to levels at which many users have large volumes of spare non-volatile memory available, which exceeds their local PC data storage requirements. For example, in a system of networked personal computers running on a Unix or Windows NT® operating system, and communicating with the file server upon which data is stored, individual PCs may have unused non-volatile data storage capacities in the range 1–9 gigabytes per PC. This effectively represents a computer resource which has been paid for, but which remains unused. Whatever the size of computer network, having unused non-volatile disk space in a network adds to the cost of ownership of a network, but provides no benefit to the network owner.

EP 0854423 teaches of a method for distributed data processing using individual platforms interconnected by a communication network. The individual platforms are configured to process, control and store data in a distributed manner. In the event of a failure of a particular platform, the remaining interconnected platforms, having shared data of the failed platform distributed across their network, process the tasks of this failed platform.

A similar distributed data processing network is found in WO 96/37837 which teaches of a computer system potentially capable of data self-repair in the event of multiple individual platform failures. This disclosure is directed to fault tolerance in a database server system.

U.S. Pat. No. 5,586,310 is further concerned with distributed data processing and is directed to provide a distributed processing system configured to update global distributed data following a local data update at an individual platform. The disclosure is of a distributed database technology, having take-over of one node's data, which resides elsewhere, upon failure of the originating node.

With reference, in part, to the prior art the inventors have recognised the need for distributed data storage utilizing spare non-volatile disk storage devices, these devices being non-localised thereby forming a distributed storage capacity. In particular, the inventors recognise a need for a management utility forming part of the distributed data storage system, whereby the management utility is capable of performing a variety of functions. In particular, the setting up of the distributed data network, the selecting of individual computer entities to participate in the network, and the sizing and dividing of individual non-volatile data storage devices in order to optimise data storage and recovery. Such a management utility not being found in the art.

The inventors have recognized that spare non-volatile disk storage capacity on individual computers in a network represents an unused resource which by putting the unused disk space to use in providing a data backup facility can be used to reduce the overall cost of ownership of a network and reduce the cost of ownership of each unit of computing capability provided by a network.

SUMMARY OF THE INVENTION

One object of the present invention is to utilize unused non-volatile data storage space on individual computers in a network of computers, for the purpose of data protection. For any individual computer, a non-volatile memory storage device, such as hard disk drive, is divided into a first area, which is available for use by the computer for storage of applications, user data, executable files and the like, and a second data storage area which is useable for storing backup data of one or more user data areas of a plurality of other non-volatile memory devices in a plurality of other computers in a network.

In the majority of prior art computer networks comprising a plurality of prior art computer entities, there exists unused non-volatile data storage area on hard disk drives which will never be used. This represents a resource which has been paid for by a customer, but which gives no benefit to the user. Specific implementations of the present invention aim to put this unused resource, which has to be paid for whether used or not, to better use in enabling a fast on-line data recovery in the event of corruption of data on at least one of the non-volatile data storage devices in a computer network. Implementation of the invention may provide a distributed data storage and recovery network having a systems manager utility which allows a user to search and select individual computer platforms to participate in the assembled global distributed data system. The manager further providing a user with the facility to configure the selected individual computer entities, with particular reference to the sizing and dividing of their non-volatile data storage devices. Specific implementations according to the invention herein may be implemented as an alternative or a conventional off-line or near-line back up system, depending upon the requirements of the owner of the computer network.

In one specific embodiment of the present invention, comprising a number N data storage devices, data from N-1 of the devices can be backed up from a remaining one data storage device.

According to a first aspect of the present invention there is provided a network of computers comprising:

a plurality of individual computer devices each having a non-volatile data storage device and each having means (305) for communicating with at least one other one of said plurality of computers;

each said non-volatile data storage device being divided into a first data storage area reserved for use by the corresponding computer device, and a second data storage area reserved for backup storage of data contained in at least one said first data storage area of at least one other said non-volatile data storage device;

a data protection component for providing data protection for user data stored on each of the non volatile data storage devices by storing the user data which is resident within the said first data storage area of each non volatile data storage device, in one or a plurality of said second data storage areas of other said non volatile data storage devices.

According to a second aspect of the present invention there is provided a computer entity comprising:

at least one data processor;

at least one non volatile data storage device being divided into a first data storage area as a reserve for use by data of said computer entity, and a second data storage area reserved for storage of data contained in at least one other computer entity; and a data protection component for providing data protection for user data of said at least one other computer entity.

According to a third aspect of the present invention there is provided a method of data protection in a network of computer entities comprising a plurality of individual computer entities, each having a data processor, and at least one non-volatile data storage device, and each having means for communicating with at least one other of said plurality of computer entities, said method comprising the steps of:

for each said computer entity;

dividing a said non-volatile data storage device of said computer entity into a first data storage area, and a second data storage area;

assigning said first data storage area for use in storing data for the operation of a corresponding said respective said data processor; and assigning said second data storage area for storage of data by at least one other said computer entity.

According to a fourth aspect of the present invention there is provided a method of data protection in a network of computer entities, each said computer entity comprising at least one data processor and at least one non-volatile data storage device;

each said non-volatile data storage device being divided into a first data storage area dedicated for use by a said corresponding respective computer entity, and a second data storage area dedicated for use in storing data of at least one other one of said plurality of computer entities; said method comprising the steps of:

searching said network of computer entities to find at least one non-volatile data storage device and selecting individual ones of said at least one non-volatile data storage devices; and copying data stored in a first said data storage area of a first said non-volatile data storage device into a second said data storage area of a second said non-volatile data storage device.

According to a fifth aspect of the present invention there is provided a method of data protection in a computer entity comprising at least one data processor, at least one non-volatile data storage device, and a network port, said data storage device being divided into a first data storage area dedicated for use by said processor, and a second data storage area dedicated for use in storing data unrelated to said processor:

said method comprising the steps of:

finding a plurality of other non-volatile data storage devices of other computer entities and selecting individual other said non-volatile data storage devices;

receiving via said network port a said data unrelated to said processor; and storing said received data in said second data storage area of said non-volatile data storage device.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 14 illustrates schematically a user interface display produced during the set up method of FIG. 12 herein;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In this specification, by the term 'data storage device', it is meant a data storage device which is seen by a processor to be a single logical data storage entity. Examples of data storage devices include: a single rotating hard disk drive; a raid array comprising a plurality of hard disk drives; a magnetic random access memory device; or the like. The term 'non-volatile data storage device' shall be interpreted accordingly.

In this specification, the term 'computer entity' refers to at least one data processor and at least one data storage device operating as a single logical data processing entity, wherein the at least one data storage device has a data storage area dedicated for storage of files used by the processor(s), for their normal operation, and which is inaccessible to other processors outside the computer entity except via the processor(s) of the computer entity. A single computer entity will usually be contained in its own discrete housing and may be shipped or transported as a whole unit within its single housing.

Figure 1:
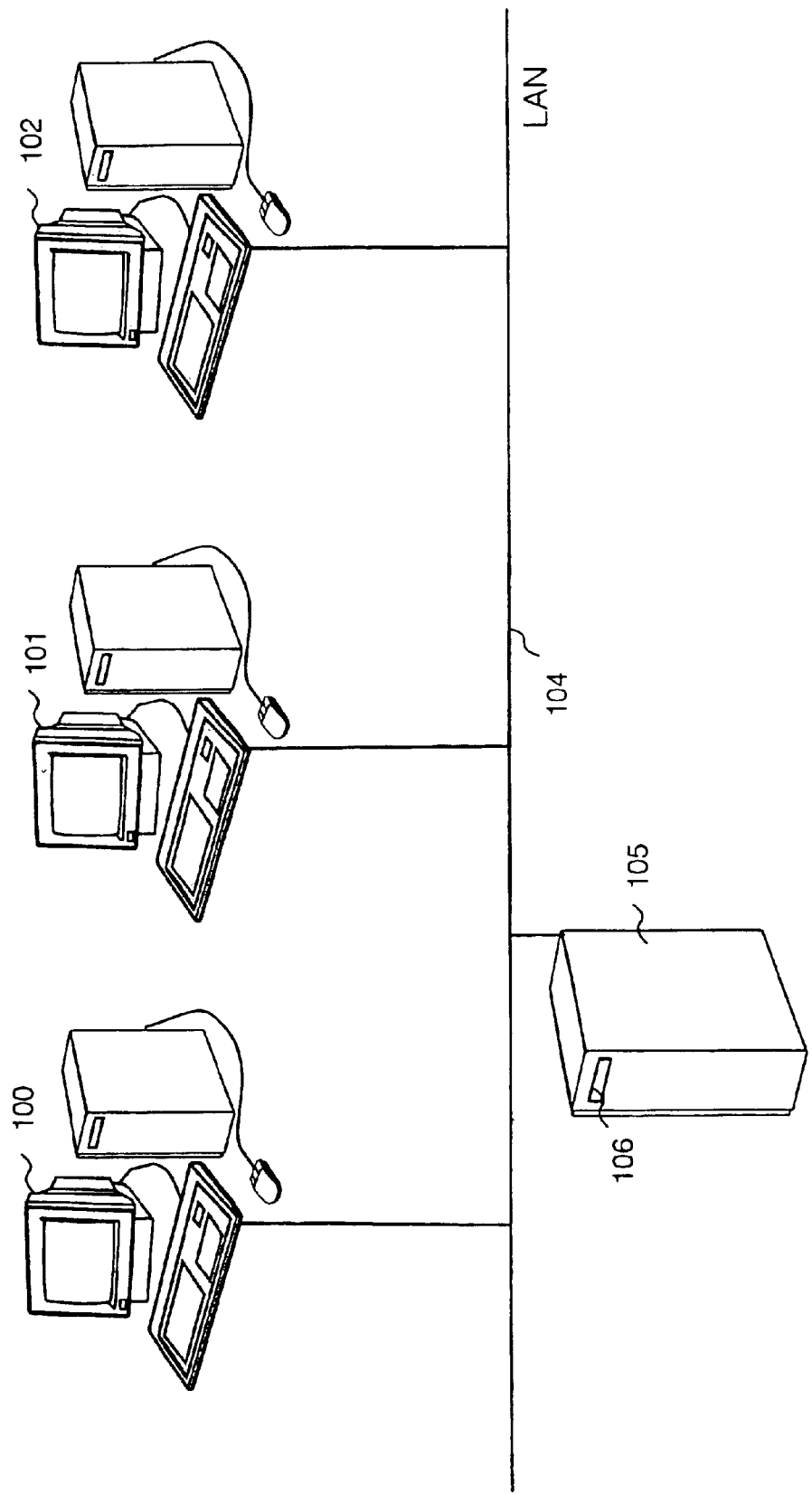
FIG. 1 illustrates schematically a prior art network of computer entities including a file server having an off-line data storage device.

Referring to FIG. 1 herein, there is illustrated schematically part of a prior art network of computers comprising a plurality of computers, for example personal computers 100–102, communicating with each other over a local area network 104; and a known file server device 105. Each of the network computers 100–102 have a non-volatile hard disk data storage device upon which are stored applications and local configurations for the computer. The file server 105 stores data files which are accessed by the computers, and is provided with a backup facility, for example a known DDS format tape drive 106. A known approach to data backup is to copy all data, signified by shaded data areas 203–205 from the hard drive disks of the network computers onto a backup device such as a DDS format tape device 206 attached to a server, either in an internal bay or on an external connection to that server. Alternatively, or additionally, data can be backed up onto an on-line data storage system such as the Auto Backup product of Hewlett Packard Company, which comprises a plurality of non-volatile hard disk devices.

Figure 2:
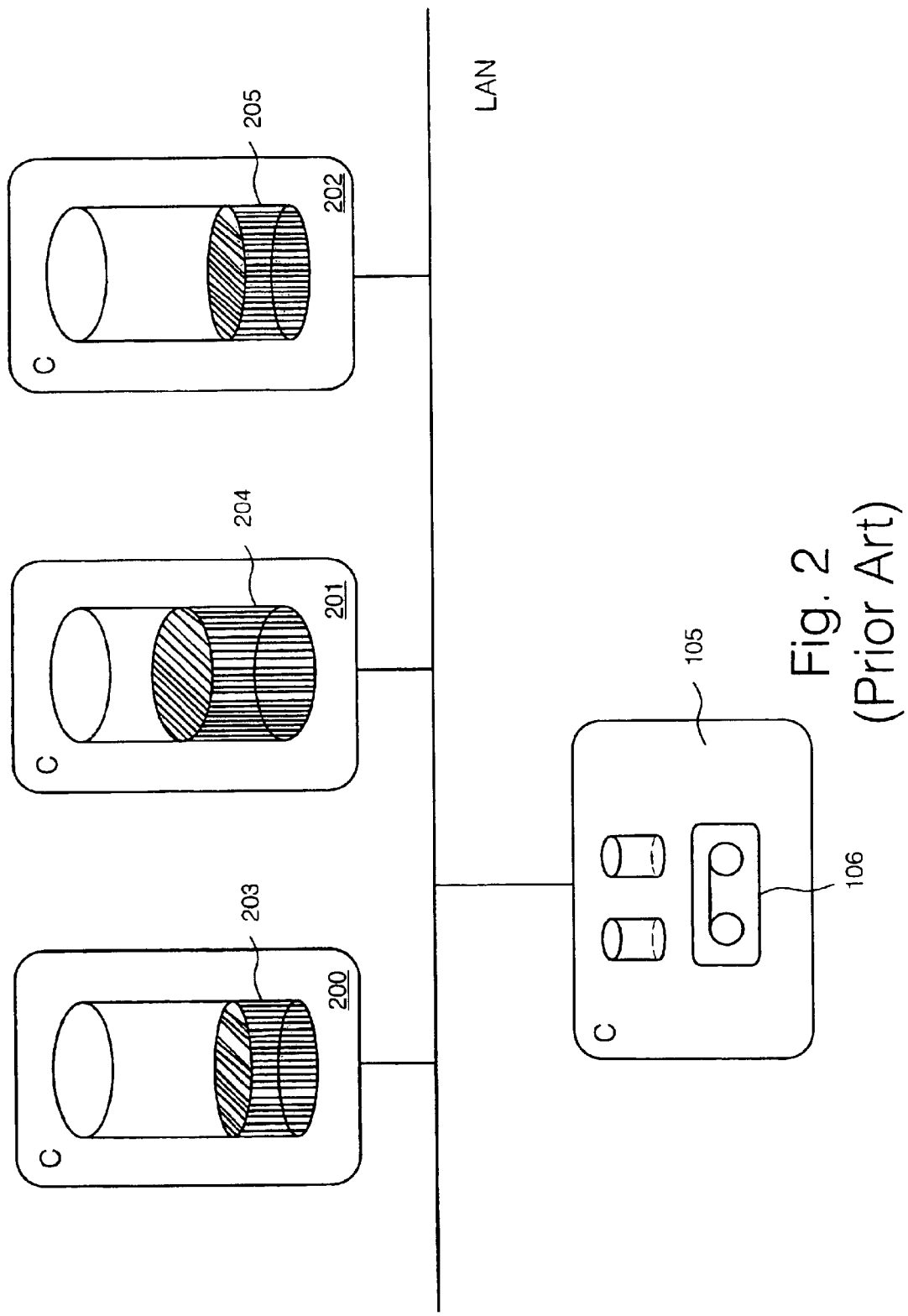
FIG. 2 illustrates schematically a plurality of permanently unused data storage areas of the plurality of computer entities in the prior art network.

Referring to FIG. 2 there is shown logically the example prior art computer network of FIG. 1 herein. Each conventional computer has a non-volatile hard disk data storage device 200–202 respectfully. For each hard disk, a proportion of the disk is likely to remain unused.

Figure 3:
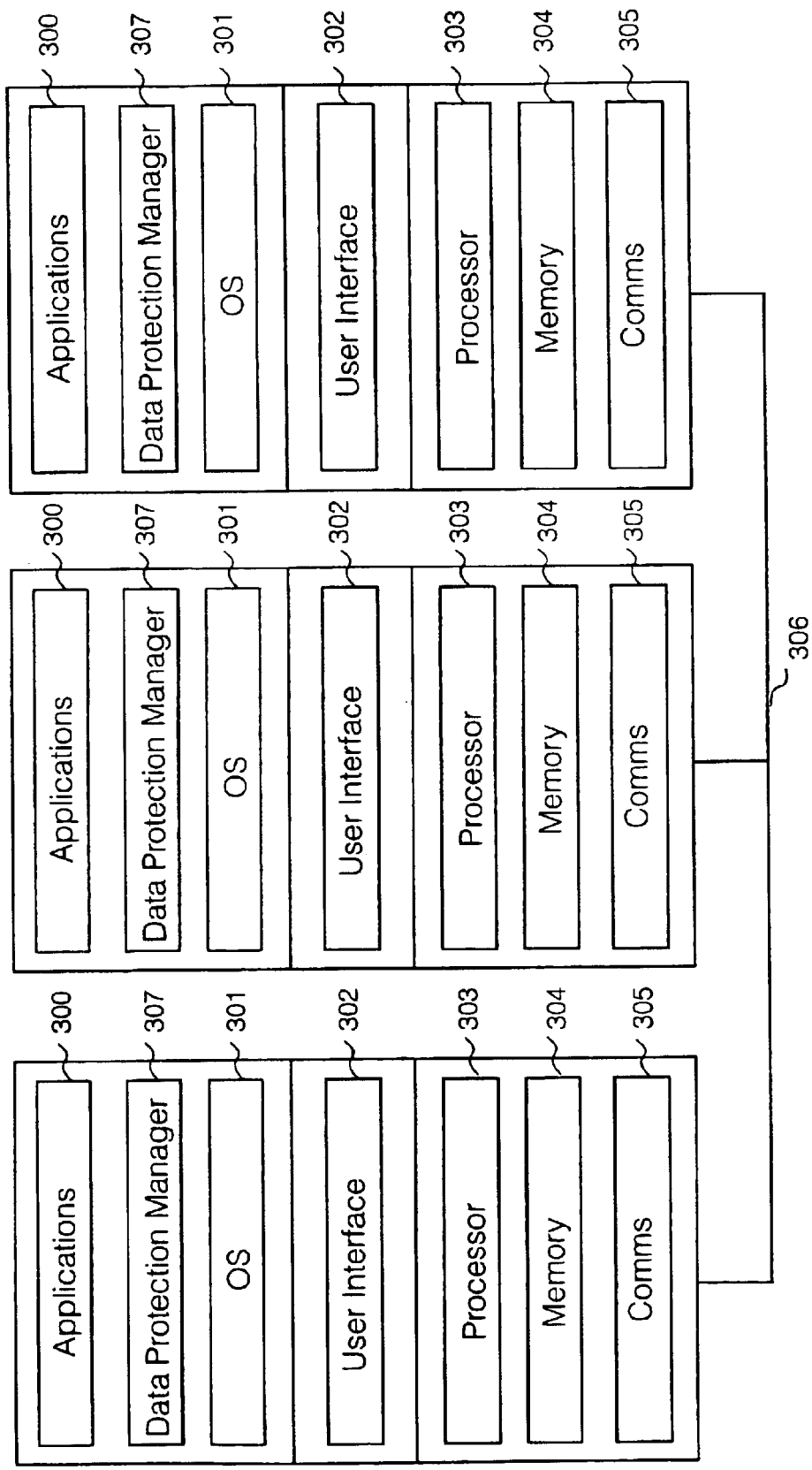
FIG. 3 illustrates schematically a network of computer entities according to a specific implementation of the present invention, in which means are provided for utilizing a plurality of unused data areas on a plurality of computer entities in the network.

Referring to FIG. 3 herein, there is shown schematically a network of computer entities modified to embody and operate according to a specific implementation of the present invention. Each computer entity comprises a plurality of application programs 300; an operating system 301; a user interface 302 including a keyboard, a pointing device such as a mouse or trackball, and a visual display unit; at least one data processor 303; an amount of memory 304 including volatile memory and a non-volatile memory device, for example a rotating hard disk drive; a communications port 305 for communicating with other computers in a network across a local area network 306; and a data protection management module 307. A computer entity may comprise a network attached storage device (NAS), which may not necessarily have attached keyboards, pointing devices and visual display devices.

It will be understood by these skilled in the art that variations of processor, peripheral device, user interface, operating system and applications may be present from computer to computer.

The data protection manager module comprises code which is stored in at least one said non-volatile data storage device. The data protection manager module 307 operates to provide data protection for data stored on each of the non-volatile data storage devices, by storing the user data, which is resident within a first memory area of each non-volatile data storage devices in one or a plurality of second memory areas of other non-volatile data storage devices of the plurality of non-volatile data storage devices.

Figure 4:
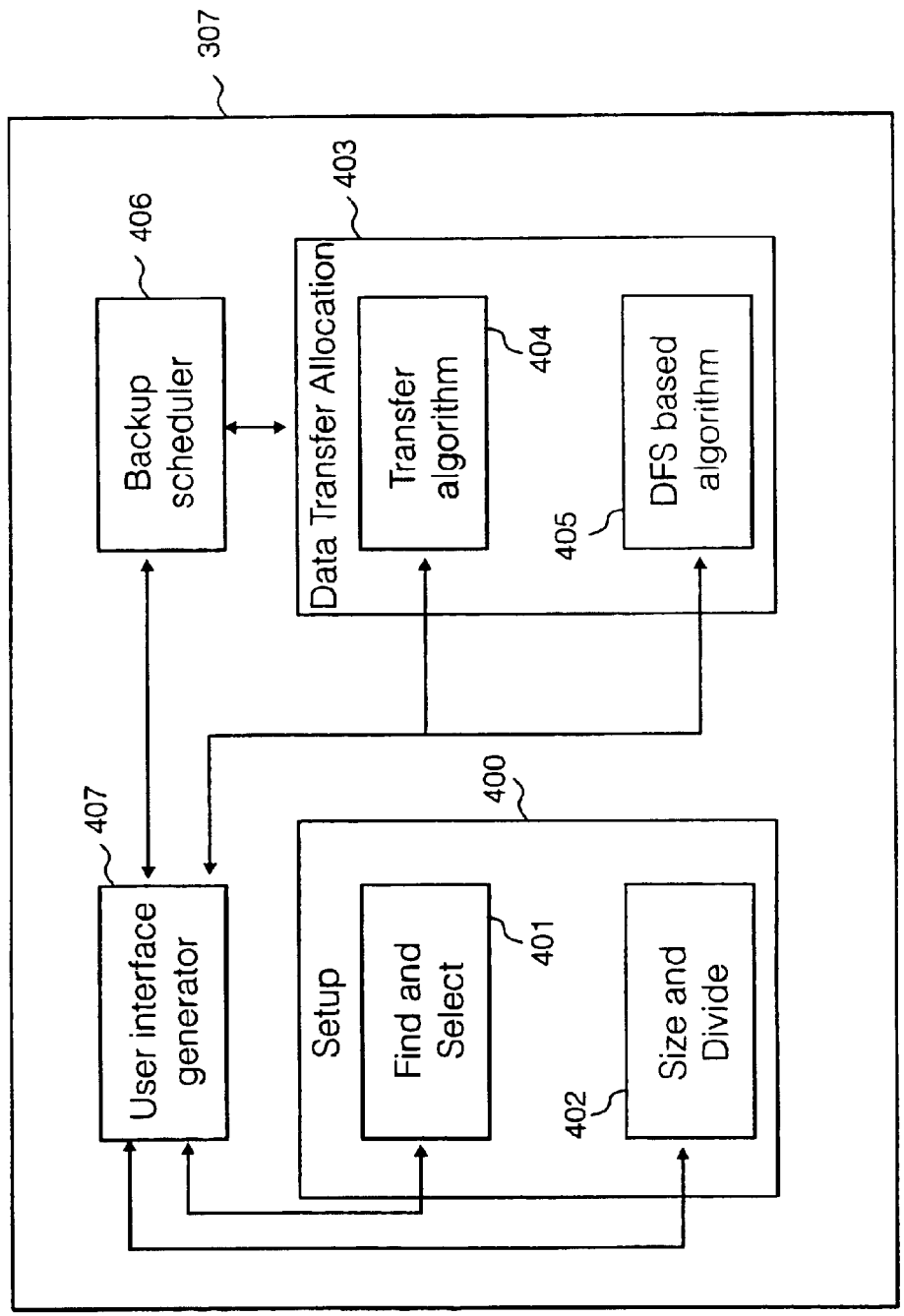
FIG. 4 illustrates schematically an architecture of a data protection manager module according to first specific embodiment of the present invention.

Referring to FIG. 4 herein, there is illustrated schematically an architecture of data protection manager 307. In a preferred embodiment, data protection manager 307 is constructed of a plurality of modules, each module comprising code capable of operating in conjunction with a processor and memory means of a computer entity, for performing the specific methods as described herein. Data protection manager 307 comprises a set up module 400 used for setting up a computer entity to operate data protection according to methods described herein, the set up module 400 comprising a find and select module 401, for finding a plurality of non-volatile data storage devices in a network of computer entities, and enabling a user to select which of the found non-volatile data storage devices will participate in the data protection methods described herein; a sizing and dividing module 402 for enabling a user to select a size of first and second data areas within an individual non-volatile data storage device, and divide the available memory area into the first and second data storage areas for each said non-volatile data storage device; a data transfer allocation module 403 for implementing transfer and copying of data between individual non-volatile data storage devices, the data transfer allocation module 403 comprising a first transfer algorithm 404 capable of operating a fully redundant mode of data protection, and a distributed file system (DFS) based algorithm 405 capable of operating a distributed scaleable data transfer method; a backup scheduler 406 for creating backup schedules and for activating copying of data between first and second data areas at preset times; and a user interface generator 407 for generating visual displays for scheduling backups, for sizing and dividing data storage areas of data storage devices, and for finding and selecting data storage devices to participate in a data protection method as described herein.

In the best mode implementation, the data protection manager 307 is installed on each of a plurality of computer entities in a computer network.

There will now be described a first specific method of operation of the network of computer entities of FIG. 3 according to the present invention.

Figure 5:
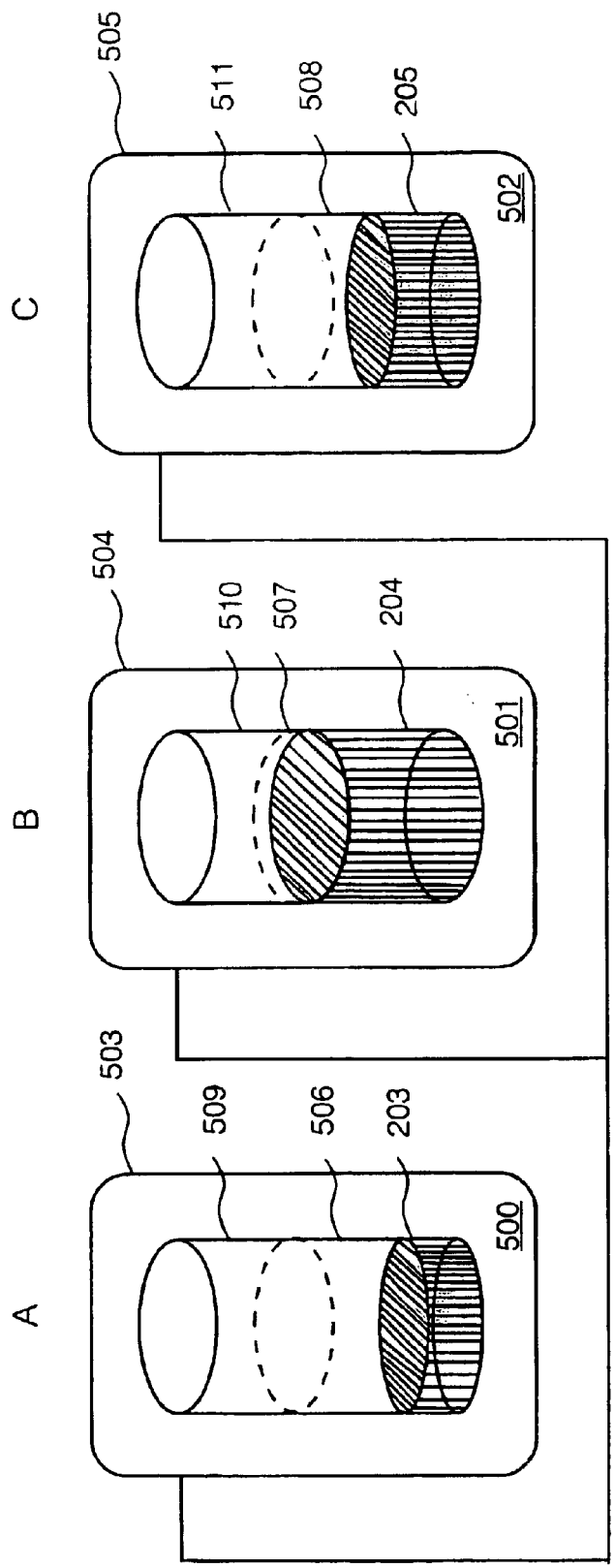
FIG. 5 illustrates schematically a plurality of non-volatile data storage devices divided into first and second data storage areas according to a specific method of the present invention.

Referring to FIG. 5 herein, there is illustrated schematically a logical representation of a plurality of non-volatile data storage devices 502–502, for example rotating hard disk drive units, within a corresponding respective plurality of computer entities 503–505. After having installed the data protection manager modules 307 onto each of a plurality of computers 503–505, each of the data storage devices 502–502 are partitioned into a first storage area 506–508 respectively and a second data storage area 509–511 respectively. For each computer, data, applications programs, an operating system and all other data and programs which are necessary for normal operation of a computer are consolidated to be stored within the first data storage area of the corresponding respective data storage device. The operating system of the computer does not access, for normal operation of that computer, the second data storage area of its non-volatile data storage device, but this is reserved for data protection of user data of at least one other of the plurality of computers within the network. The first data storage areas 506–508 respectively, may be pre-selectable by the data protection manager 307 to reserve a selectable percentage of the overall data capacity of the data storage device. For example, where a 9 Gbyte drive is installed, one Gbyte of data storage space may be reserved as the first data storage area, and the operating system, applications, drivers, and user data for normal operation of the computer may be resident in that first data storage area. The second data storage area may comprise the remaining 8 Gbytes of available user data space.

For example in a network comprising 9 computers each having a 9 Gbyte non-volatile data storage device, pre-configured such that each data storage device has a 1 Gbyte first data storage area and an 8 Gbyte second data storage area, in a robust first mode of operation, each data storage device contains backup data from the other 8 data storage devices. That is, where the 9 computers are labeled A-I, the first data storage area of the data storage device of first computer A contains data specific to computer A only, and the second data storage area 509 of first computer A contains data which is stored in the first data storage areas of the remaining 8 computers B-I. Thus, the 9 Gbytes of available data storage area on the non-volatile data storage device of first computer A is occupied by the user data of first computer A, resident in the first data storage area 506, and the computer specific user data in first data storage areas of each of the other 8 computers B-I is stored in the second data storage area 509 of the first computer A.

Similarly, for second computer B, the first data storage area 507 of that computer's data storage device is occupied by data which is specific to second computer B, whereas the second data storage area 510 of the second computer B is occupied by the computer-specific data of first and third to ninth computers A, C-I. Similarly, for the third to ninth computers, each computer stores its own computer specific data, in its own first data storage area, as well as storing the computer specific data of all the other computers in the network in the second data storage area of that computer.

This mode of operation is robust, since the data from all 9 computers in the network can be recovered from any one computer's data storage device. It will be appreciated by those skilled in the art that in a fully robust mode of operation, where each computer stores its own data and the data of all other computers, the number of computers which can participate in such a system is limited by the size of the data storage device in each computer, and the required amount of computer-specific data storage area (the first data storage area) which is required.

Within each second data storage area 509–511 the available non volatile storage area may be pre-partitioned, such that a specific set of memory locations are reserved for each other computer in the network, so that other computers in the network which have a low amount of data actually stored in their first data storage areas will still have available in each other computer, a partition of size corresponding to the first data storage area.

Alternatively, the partitioning of the second data storage area of each data storage device may be allocated dynamically and filled up by replication of data in the plurality of first data storage areas of the other computers in the network as and when required.

Figure 6:
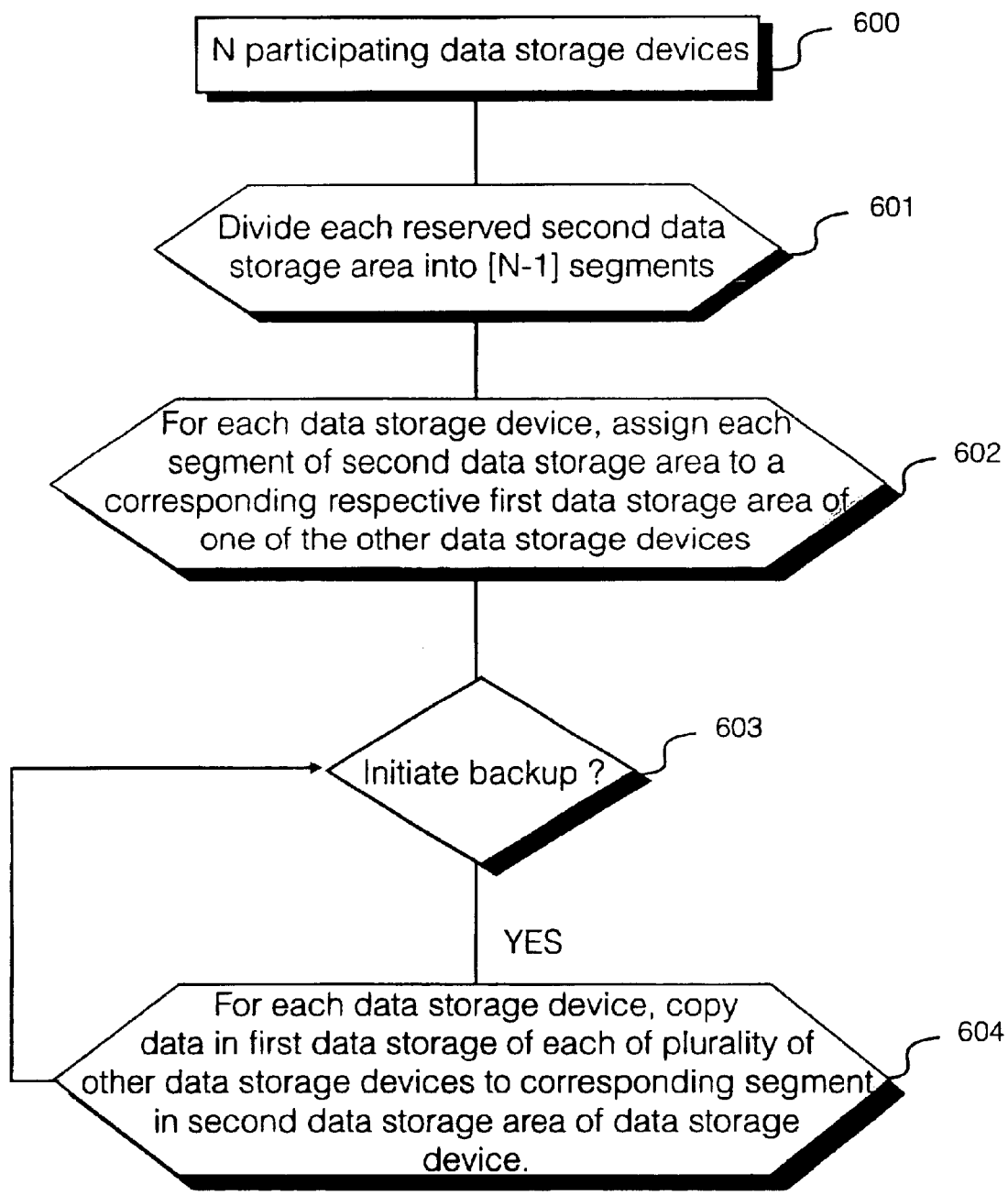
FIG. 6 illustrates schematically a first mode of operation of a computer network according to a first specific implementation of the present invention.

Referring to FIG. 6 herein, there are illustrated schematically process steps carried out by data protection manager 307 for data protection of N selected data storage devices. In step 601, the data manager divides the reserved second data storage area into N-1 segments. This may be achieved during a setup procedure in which a user may select which data storage devices participate in the data protection process. For a number N participating data storage devices, the data storage manager 307 partitions each second data area of each of the N participating data storage devices into a number N-1 segments. In step 602, for each data storage device, each of the N-1 segments are assigned to a corresponding respective first data storage area of each of the other ones of the plurality N of data storage devices participating in the system. In step 603, it is checked whether the data protection backup is initiated. Initiation of a data protection backup can be made periodically, according to a backup schedule for each of the N participating data storage devices independently, or all other the plurality N of data storage devices can be backed up simultaneously. In step 604, data in the first data storage area of a first data storage device is copied onto a corresponding segment on each of the other ones of the plurality of data storage devices, so that N-1 copies of the data in the first data storage area on the first computer are made. Similarly, for second, third and N data storage devices, data in the first data storage area of these devices is copied to same data storage areas on each of the N-1 other data storage devices. The result is that for each first data storage area, N-1 copies of the data contained in that first data storage area are made in the second data storage areas of the N-1 other data storage devices.

Figure 7:
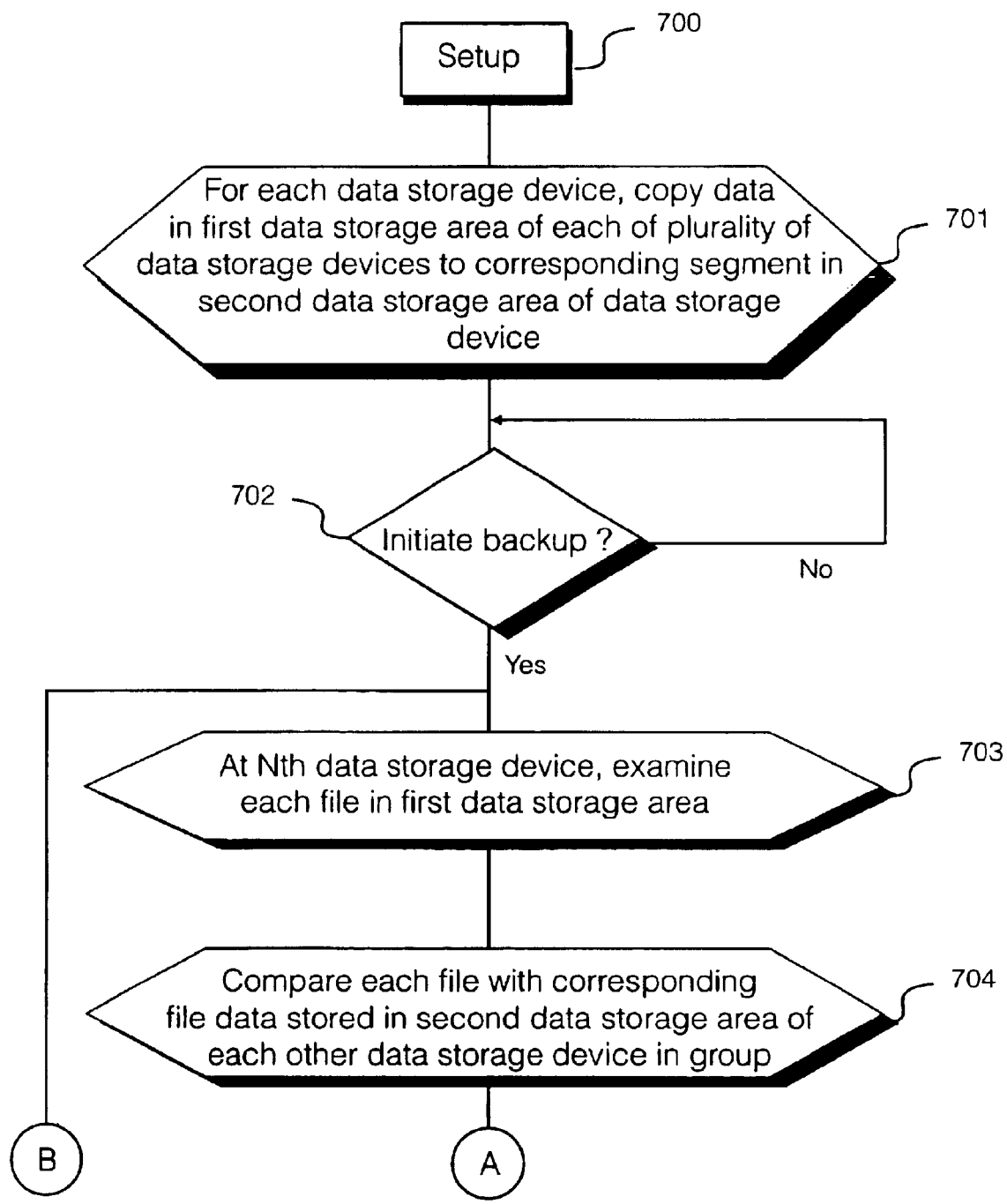
FIG. 7 illustrates schematically a second mode of operation, being a differential backup mode, according to the first specific implementation of the present invention.
Figure 7:
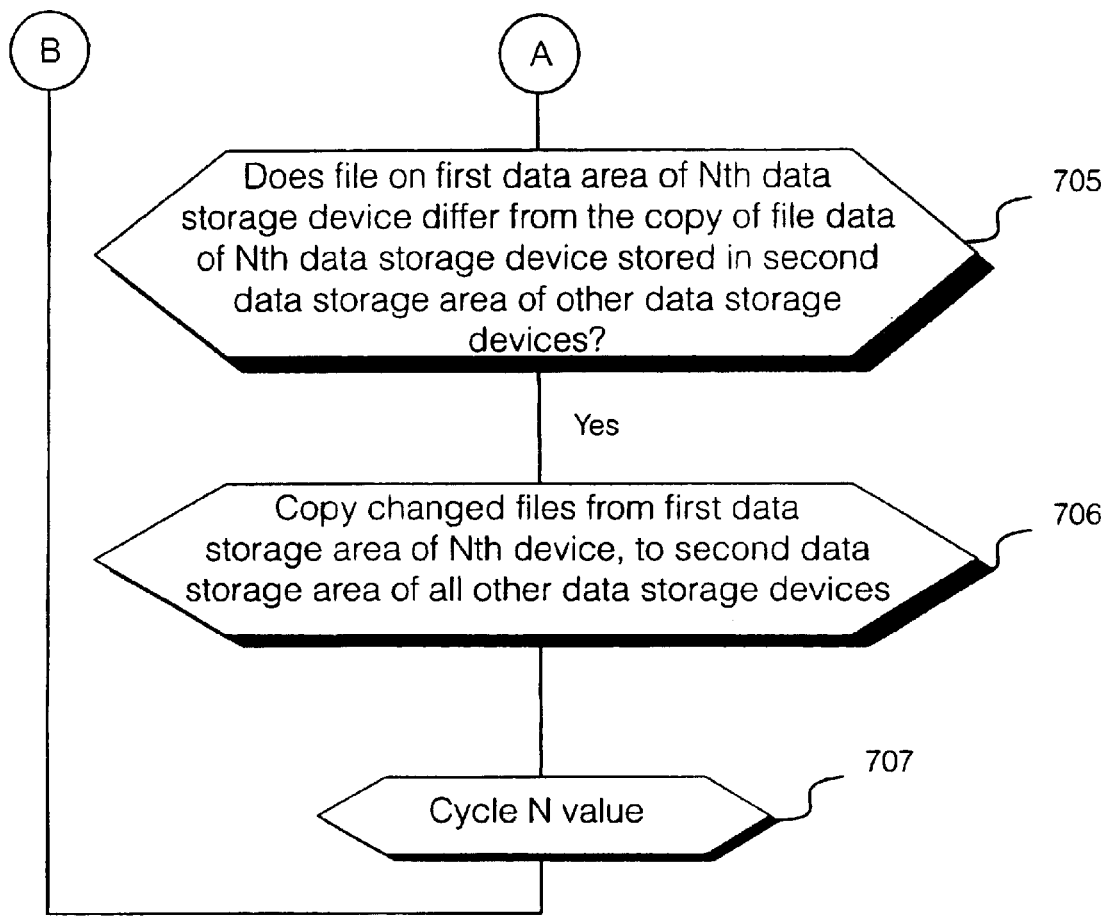

Referring to FIG. 7 herein, there is illustrated schematically process steps for a second mode of operation of data protection manager 307. Transfer algorithm 404 operates in a differential backup mode when activated by backup scheduler 406. In step 700, set up module 400 is used to set up a plurality of computer entities as illustrated in FIGS. 3 and 5 herein as described in steps 600 and 601 previously. In step 701, for each data storage device, data files which are resident in the first data storage area of that device are copied to a corresponding respective partition in each of the plurality of N-1 other data storage devices in the selected group of N data storage devices. Each second data storage area has N-1 partitions, each partition assigned to a corresponding respective data storage device other than the data storage device on which the partition exists. Either single parity or distributed parity may be used throughout the plurality of disks in the group. The first data storage area is reserved for use of the computer to which that data storage device belongs. In step 702 backup is initiated via back up scheduler 406, either automatically, or in response to a user request. In steps 703 to 707, the transfer algorithm 404 in a differential backup mode cycles through each of the plurality N data storage devices which have been selected as a backup group by a user via set up module 400. In step 703 data files in the first data storage area of an $N^{TH}$ data storage device of the group is examined. In step 704, each file in the first data storage area of the NTH data storage device is compared with a corresponding file in each of the individual partitions within the second data storage areas of the remaining N-1 data storage devices. If the files in the first data storage area differ from those stored in the second data storage areas in step 705, then in step 706 the files in the first data storage area which are found to have been changed, that is different to those stored in the second data storage areas, are copied to each of the second data storage areas of the other data storage devices in the group. In step 707, the value of N is cycled, that is incremented or decremented, to look at the next of the N data storage devices in the group. The loop 703–707 continues whenever a backup is initiated, or periodically, so that differential backups of files which have changed since a previous backup, are copied to the second data storage areas.

Figure 8:
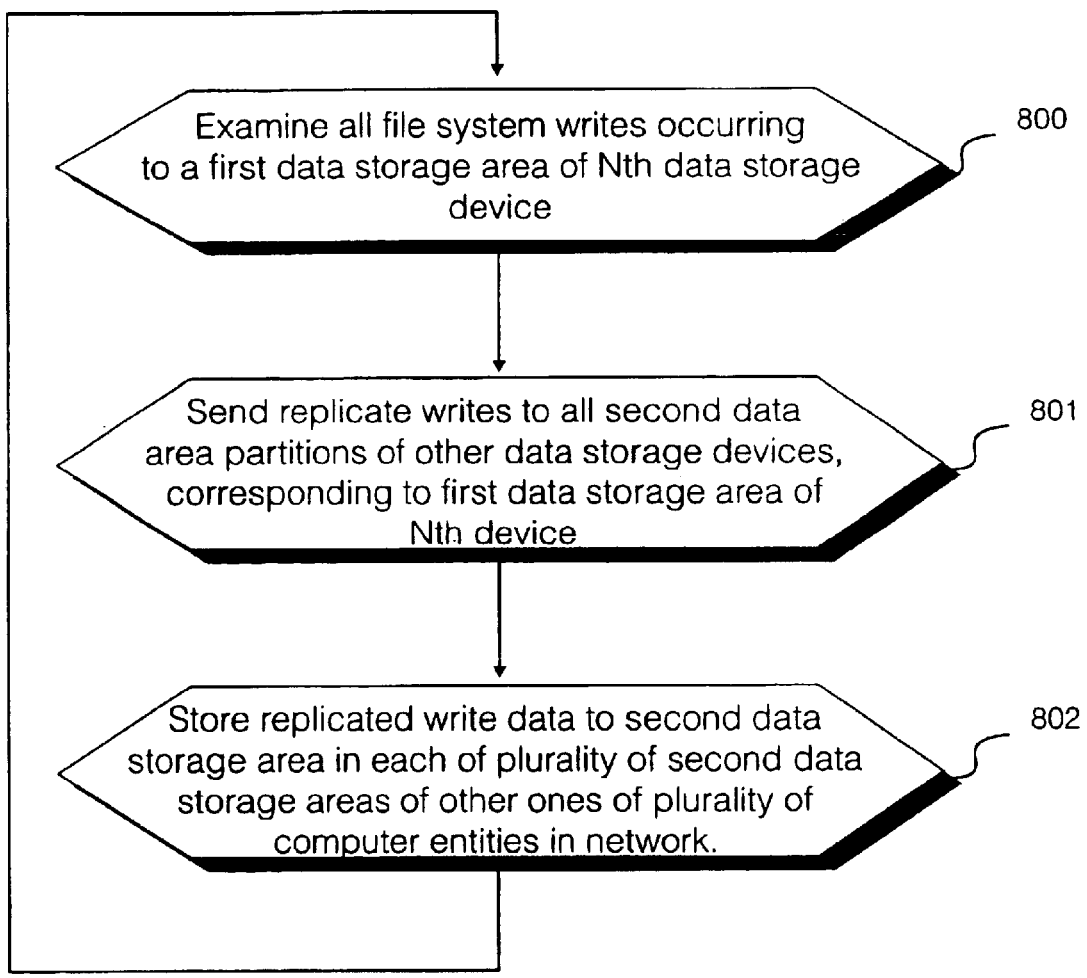
FIG. 8 illustrates schematically a third mode of operation, being an on-line backup mode of the first specific implementation of the present invention.

Referring to FIG. 8 herein, there is illustrated a third mode of operation implemented by the transfer algorithm 404 in the data transfer allocation module 403. The third mode comprises an on-line mode of data protection. Rather than operating the first or second modes of operation, that is the full back up differential backup modes, which are activated at a specific point in time, the third on-line mode operates substantially continuously during operation of a network as a background ongoing data protection process. The process shown in FIG. 8 may run independently on each of a plurality of N computer entities in a group. In step 800, all file system writes occurring to a first data storage area of the $N^{TH}$ data storage device are examined by the data protection manager 307. Whenever a file system write occurs, in steps 801 and 802 the write is replicated and sent to each of the partitions corresponding to the first data storage area of the $N^{TH}$ device, the partitions being resident in the second data area partitions of all other data storage devices. The steps 800, 801 continue, activated by writes to the first data storage area until the on-line backup procedure is stopped by a user entering commands through backup scheduler 406. In a network of computer entities comprising a group of N computer entities selected in an on-line backup group, for each computer entity, writes to the first data storage area of that computer activate sending of replicate data writes to all other computer entities for storage in the second data storage areas of the other computer entities. Writes may be sent across the network substantially simultaneously and independently, by each of the N computer entities in a group.

Figure 9:
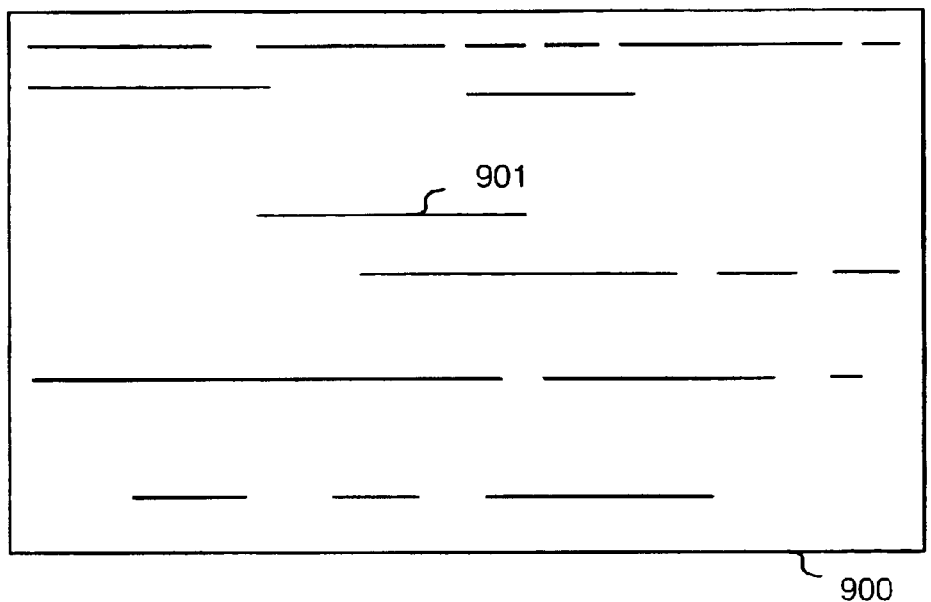
FIG. 9 illustrates schematically an undivided data storage area of a non-volatile data storage device containing data files distributed throughout the whole of the data storage area in non-contiguous fashion.

Referring to FIG. 9 herein, there is illustrated schematically as a series of lines, data written to a non-volatile data storage device, for example a rotating hard disk drive. A data storage area 900 comprising the whole of the non-volatile data storage device is occupied by individual files designated as lines 901. Data may be written at logical locations which are non-contiguous within the data storage area.

Figure 10:
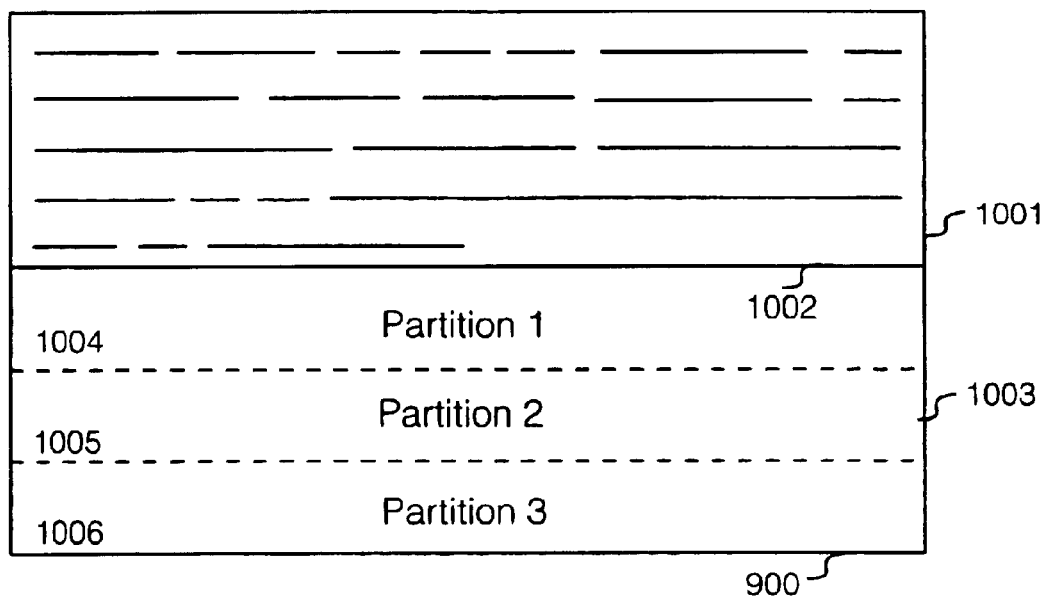
FIG. 10 illustrates schematically a divided data storage area comprising a first data storage area reserved for use by a processor of a same computer entity as the data storage device, and a second data storage area reserved for use by other computer entities.

As a prerequisite to dividing a data storage device into a first data storage area reserved for use by a computer to which the data storage device forms an integral part, and a second data storage area reserved for use by other computers in a network, existing data on the device is consolidated into a set of contiguous addresses within a first data area 1001 of the data storage device, as illustrated schematically in FIG. 10 herein. The data storage device is divided such that the operating system of the computer having immediate access to the data storage device can only utilize the first data storage area 1001 for operations involving data used locally by the computer. Storage of the computer's operating system, drivers, executable files and local data files is made in first data storage area 1001. A logical division marker 1002 is made such that the file system of the computer does not make accessible to normal use any non volatile data storage locations beyond the division marker 1002. The second data storage area 1003 is reserved for use in storing data of other computers in the network. The data storage manager module 307 controls access to the second data storage area 1003, by instructing the processor of the computer to transfer data received from the communications port 305 into and out of the second data storage area 1003.

Figure 11:
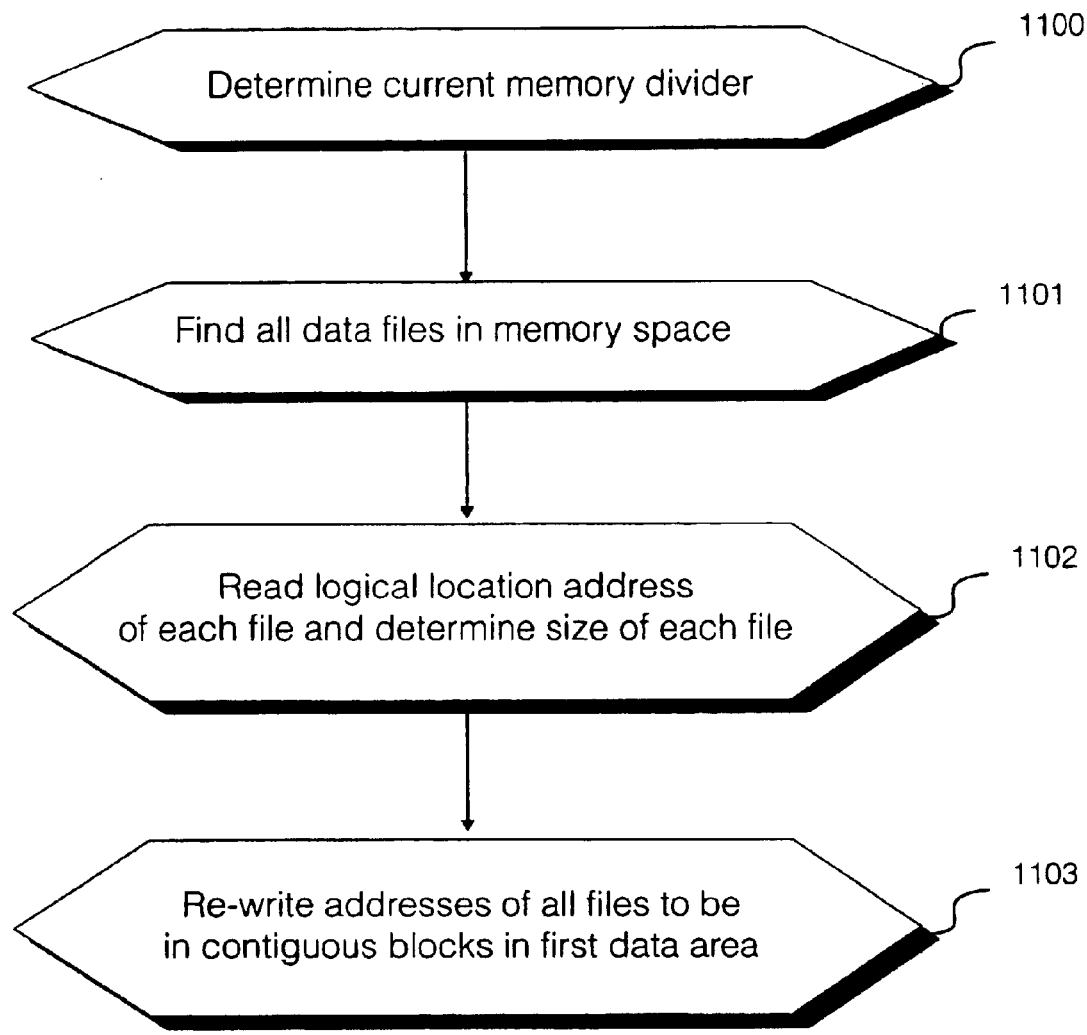
FIG. 11 illustrates schematically a method for partitioning a data storage area of a non-volatile data storage device according to a second specific method of the present invention.

Size and divide module 402 operates as illustrated schematically in FIG. 11 herein. In step 1100, the module determines the location of the current memory divider 1002, to determine the boundary of the first data area. In step 1101, the size and divide module 402 finds data files in the entire non volatile data storage space 900 of the data storage device. In step 1102 the module 402 reads the logical location address of each file, and determines a size of each file. In step 1103, the module 402 rewrites the addresses of all the found files, such that those files are placed in contiguous blocks in the first data area. This leaves the second data area 1003 available for use in storage of data of other computers. As will be appreciated by those skilled in the art, computer programs for examining non volatile data storage area and rearranging data files in contiguous order are available in the art and may be incorporated into the data protection manager 307 of the first embodiment. Data files are moved from their original physical locations on the data storage device to new contiguous blocks of data within the first data storage area. The second data area is an unused resource as far as the computer's operating system is concerned. The second data area is not used by the file system of the operating system resident on the computer.

Figure 12:
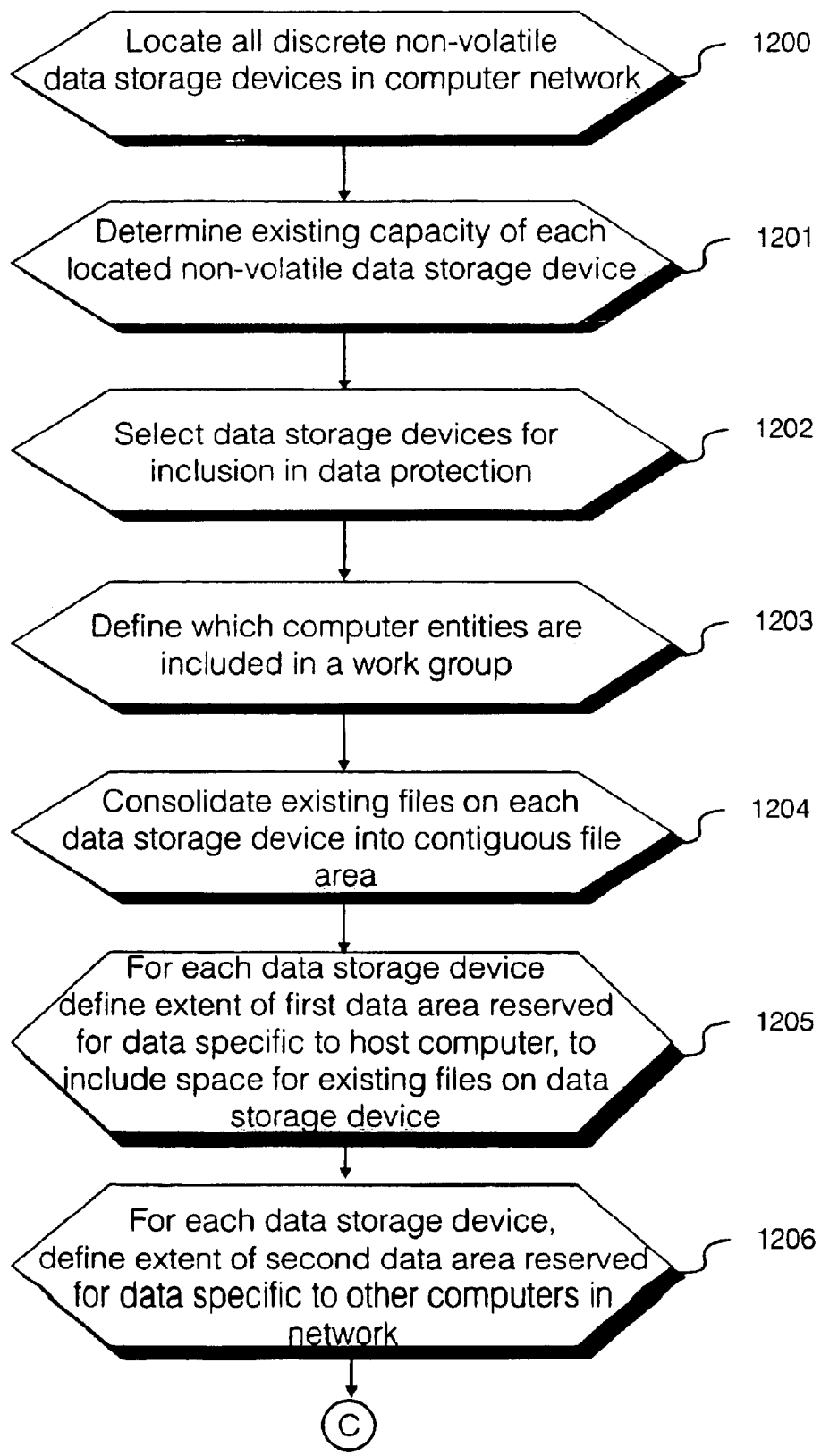
FIG. 12 illustrates schematically a set up method for setting up a computer network to operate a data protection method.
Figure 12:
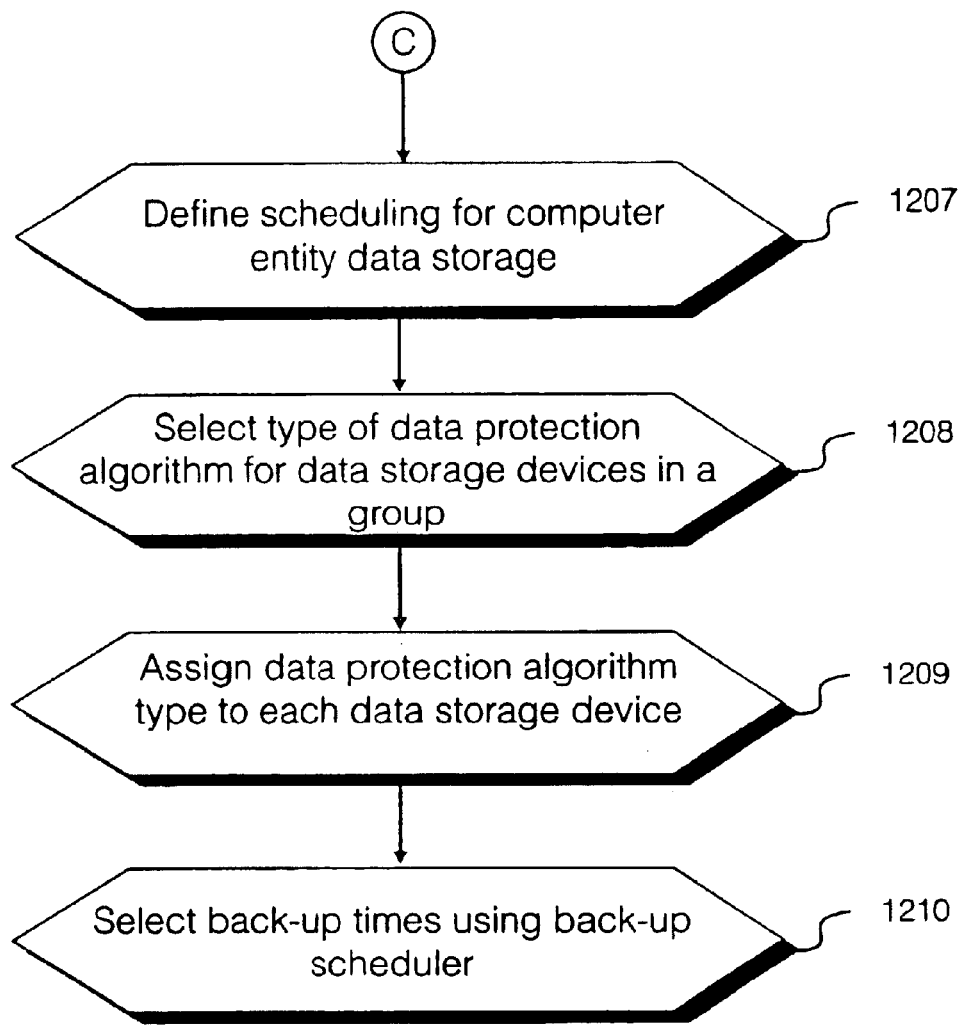
Figure 13:
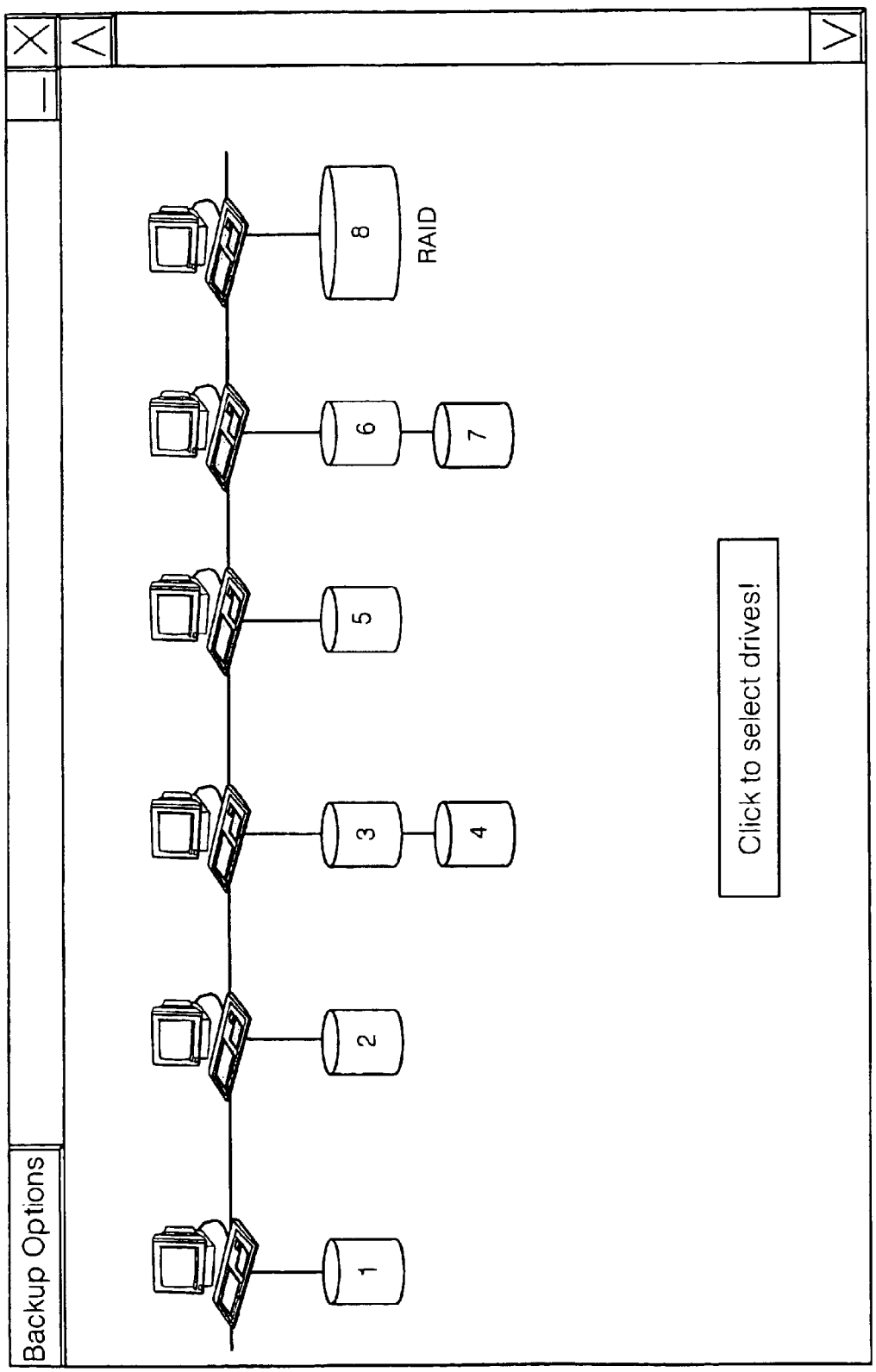
FIG. 13 illustrates schematically a user interface display for finding and selecting computer entities as part of the set up method shown in FIG. 12.

Referring to FIGS. 12–14, there is illustrated schematically a set up procedure for selecting a plurality of computer entities to participate in a data protection work group, and for selecting the type of data protection and the timing of data protection to run within the workgroup. In step 1200, a user at any of the computer entities on which the data protection manager 307 is installed, having the user interface generator facility 407, may use a display generated on a visual display unit of the computer's user interface to select individual non-volatile data storage devices in a computer network. Such a display may include a plurality of icons as illustrated in FIG. 13 showing a number of computers networked together, and displaying icons showing the individual non-volatile data storage devices which are assigned to those individual computers. In the example of FIG. 13, there are shown 6 different computer entities, some of which have more than one non-volatile data storage device.

In step 1201, the existing capacity of each located non-volatile data storage device is found.

In steps 1202–1203, set up module 400 is used by a user to find and select a plurality of individual computer entities having associated data storage devices, and to define such data storage devices into a data protection group in which data from each of the plurality of data storage devices in the group is distributed amongst the plurality of data storage devices in the group. Existing data files on the data storage devices are consolidated to contiguous sets in the first data storage area of the devices in step 1204.

In step 1205, for each data storage device, a second data area is defined, the second data area being reserved for data specific to other data storage devices in the network, comprising other computer entities. Definition of the second storage area size restricts the size of the first storage area.

In step 1207, a computer entity can be selected by a user to initiate the backup procedure. In a data protection group comprising a plurality of computer entities, one computer entity may be selected to control backup of all data storage devices in the group. In step 1208, a type of data protection algorithm may be selected for the data storage devices in a particular group. A particular type of data protection algorithm is assigned to each data storage device in step 1209 following selection in step 1208. As shown schematically in FIG. 14, computers in a network may be divided into different data protection groups. For example, computers having drives 1, 2, 3, 6 and 8, where drive 8 is a 20 gigabyte RAID array, are included in a same group, operating a distributed file system based data protection algorithm as herein after described. Computer 4, 5 and 7 comprise a second group which may operate according to a fully redundant mode as described herein with reference to FIG. 6. In step 1210, a user may program the backup scheduler using backup schedule module 406 via user interface generator 407. It will be appreciated by those skilled in the art, that prior art code is available for scheduling backups, for example as used in the Hewlett Packard Colorado backup scheduler. Backup scheduler 406 may comprise a prior art code module, adapted to operate within the data protection manager 307.

Whereas the first data protection method and apparatus may operate satisfactorily for small clusters on computers, or work groups of computers in a larger network, the number of data storage devices participating in the first method and apparatus are limited by the data capacity of the non-volatile data storage devices and the amount of user data specific to a particular computer which is stored in a first data area. A more scaleable solution is provided by the second data protection method described herein, in which data of a plurality of first data areas is distributed over a plurality of second data areas.

The second data protection method makes use of a distributed file system algorithm module 405.

Figure 15:
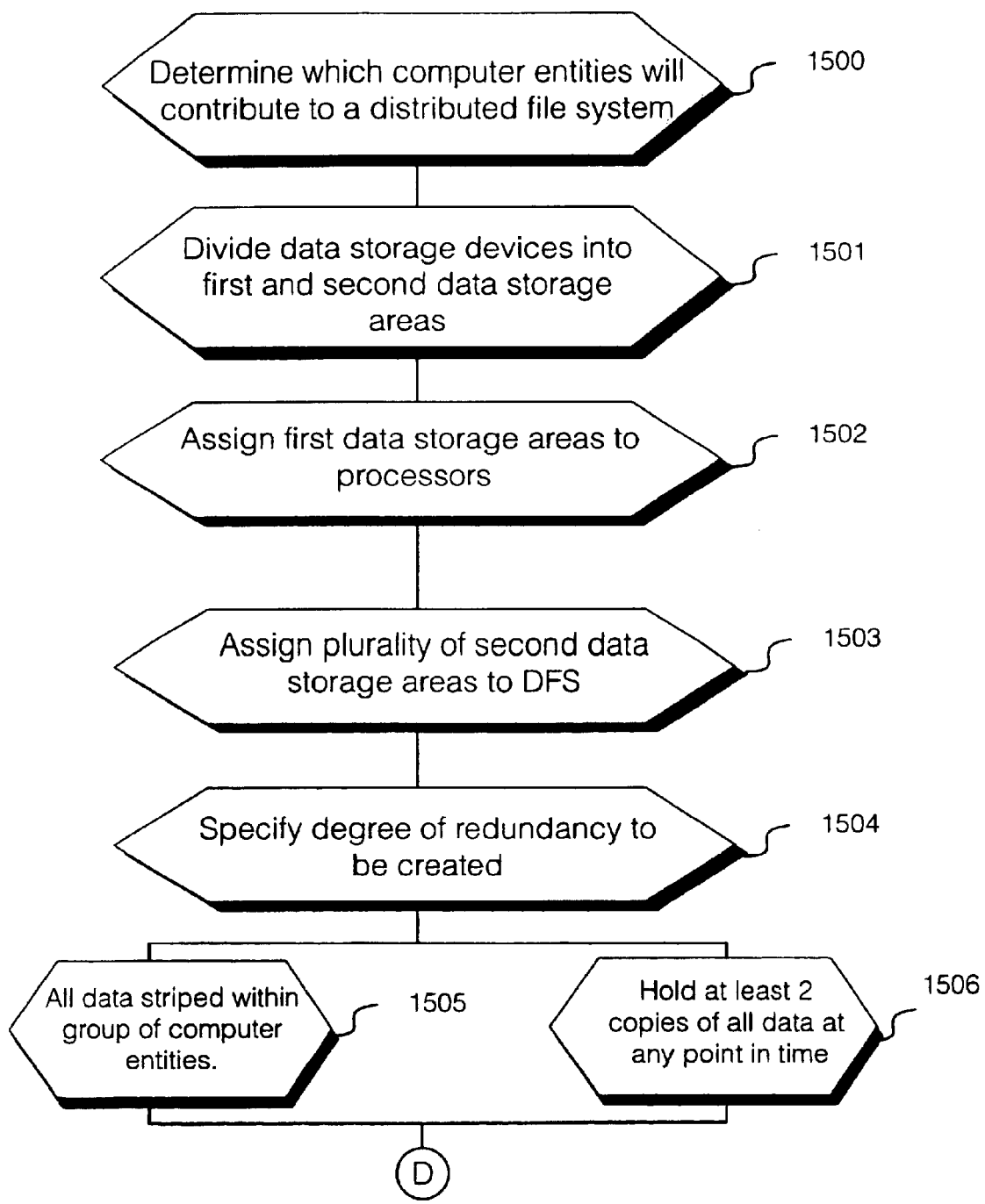
FIG. 15 illustrates schematically a second set up procedure for setting up a second data protection method according to a second specific implementation of the present invention.
Figure 15:
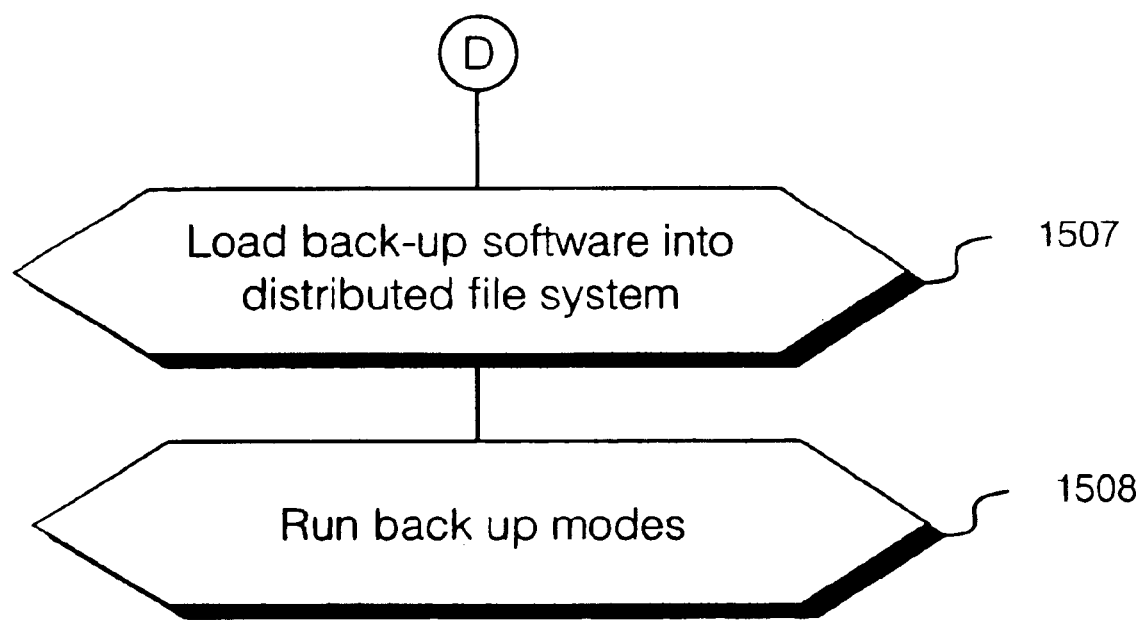

Referring to FIG. 15 herein, there is illustrated schematically a data protection scheme based upon a distributed file system. In step 1500, a distributed file system is set up. As will be appreciated by those skilled in the art, distributed file systems are known in other prior art environments. A prior art distributed file system algorithm may be incorporated into the DFS based data protection algorithm 405. A group of computer entities over which the distributed file system data protection method will run over is selected similarly as herein before described using a computer selection displayed as shown in FIG. 13 and a drive selected display as shown in FIG. 14. In step 1501, each selected data storage device to participate in a data protection group is divided into a first and second data storage area similarly as herein before described. In the general case, each data storage device must be configured into first and second data storage areas independently, since the data storage devices may, in practice, be of different capacities to each other. For example, one data storage device may have a 4 gigabyte capacity and a division of a first data storage area of 1 gigabyte may be selected and a second data storage area of 3 gigabytes. On the other hand, a second data storage device of 20 gigabytes capacity may be partitioned into a 5 gigabyte first data storage area and a 15 gigabyte second data storage area. Configuration of each non-volatile data storage device may be made by configuring that particular associated computer entity locally, or, provided permissions are set allowing reconfiguration of the non-volatile data storage device from other computer entities, configuration may be made from a single computer entity, selecting each data storage device in the networked system. In step 1502, each first data storage area is assigned to a corresponding processor, and the first data area is reserved for storing data concerned with that particular processor. In step 1503, each second data storage area is assigned to the distributed file system. In step 1504, a degree of redundancy for the data protection scheme is specified by a user, using the displays generated by user interface display generator 407. One option for a degree of redundancy to be created in the data protection scheme, which may be selected in step 1505, is to operate a community of computer entities in a similar manner to which a redundant array of inexpensive disks (RAID) would be operated. If the data protection group comprises a number M computer entities, then data of an $M^{th}$ computer entity is rewritten across a stripe extending across a remaining M-1 computer entities in the group. In one embodiment the second data storage space in the $M^{th}$ computer entity, is used for storing data parity checks. This allows efficient use of the second data storage areas. In another embodiment, parity may be distributed throughout the disks. These modes of operation has an advantage over prior art RAID arrays, in that a prior art RAID array may fail as a whole unit (although prior art RAID arrays are themselves made of individual component units which are in themselves replaceable).

In the present system, each individual computing entity is discrete, and unlikely to fail, and two computer entities will not fail as a single unit together. Whilst any individual computer entity or data storage device in that entity may fail as a complete unit, it is unlikely that all computer entities or two computer entities in a group will fail simultaneously. In contrast, a conventional RAID array may have a single point of failure caused by its reliance on a single processor. Similarly, a conventional RAID array is physically present in a single physical box. If theft of apparatus occurs, then it is likely that the whole physical box will be taken. In contrast, in the present implementations, individual computer entities are provided in separate discrete individual boxes. A complete discrete computer entity may be removed, leaving other computer entities in place, and data recovery may still be obtained from the remaining computer entities.

Prior art distributed file systems are not intended for use with data backup. However, the functionality of a conventional distributed file system may be utilized for distribution of data of one computer entity over a plurality of other computer entities in a data protection group. Configuration of the data protection system depends upon a user's preference for redundancy. A user may select how a community of computer entities share their data between their non-volatile data storage devices. A number of concurrent failures of computer entities from which data is still recoverable, may be specified by a user by selecting how computer entities share data between their data storage devices within the data protection group. The network may be expanded by addition of a network based non-volatile data storage device, for the purposes of expansion and extra data protection.

In step 1506, a user may select a second DFS mode of operation, in which the distributed file system is requested to hold at least two copies of all data at any point in time. For example, in this method, where, for example there are computer entities A, B, C and D and the data of computer entity A as well as being stored on a first data storage area of computer entity A is also stored in the second data storage areas of computers B and C, and then computer C is removed from the system, the distributed file system detects that data from A is now stored only on the first data partition area of A and the second data partition area of computer B, and therefore creates another copy of the data of A on a fourth computer D. In this system, there are forced to be at least two copies of data made available within the group of computer entities at any one time. Reallocation of data is achieved dynamically under control of the distributed file system.

Figure 16:
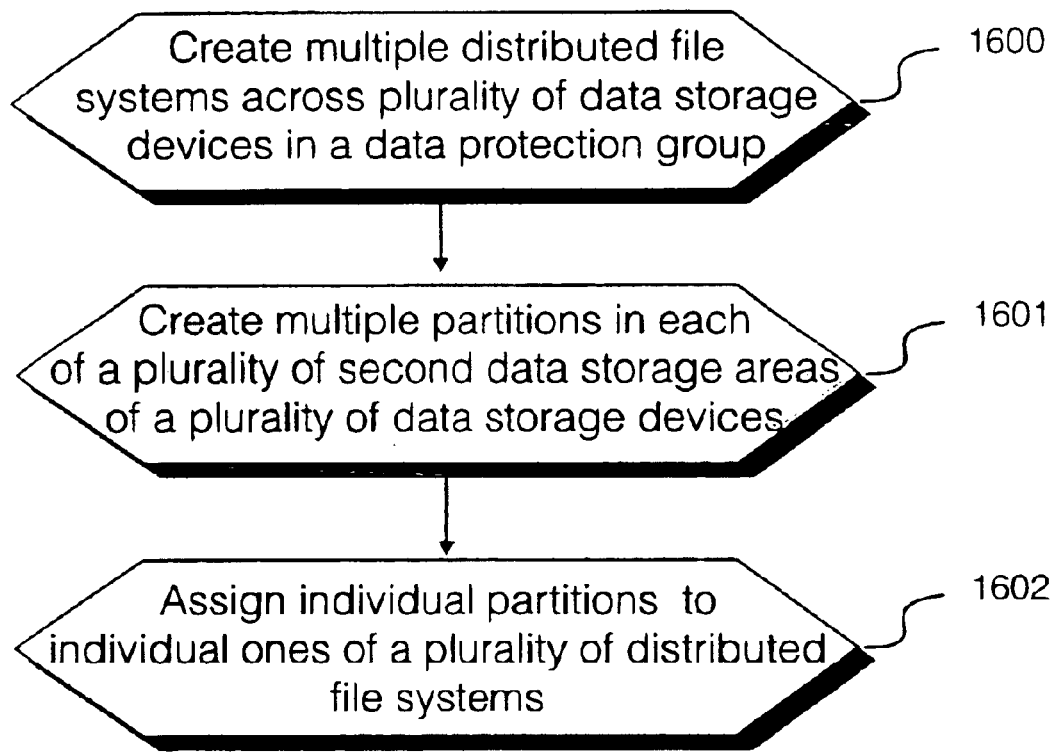
FIG. 16 illustrates schematically a set up option of the second set up method shown in FIG. 15.

Referring to FIG. 16, in step 1506 holding at least two copies of all data at any point in time may be approached by creating multiple distributed file systems across a plurality of data storage devices in a data protection group in step 1600. This is achieved by creating multiple partitions in each second data storage area of each of a plurality of data storage devices in step 1601. The partitions may be of various different sizes, and each partition may contribute independently to a different logical distributed file system. Across all computer entities, a first level of DFS may run, followed by a second level of DFS configured to a different level of redundancy, and subsequent layers of DFS, each configured according to user selected preference to different levels of redundancy by assigning individual partitions to individual ones of a plurality of distributed file systems in step 1602. For example, a first distributed file system may be configured to stripe across all second data storage areas (step 1505). A second distributed file system may be configured to back up individual first data storage areas to specified individual second data storage areas (1506).

Once the distributed file systems are set up, in step 1507, backup software is loaded. The backup software provides modes of operation including full backup, differential backup, and on-line backups as herein before described with reference to FIGS. 6–8. By virtue of the fact that all the computer entities are contributing to the distributed file system, any software loaded into the distributed file system is immediately visible to all computer entities, including the backup software. Therefore, the backup software needs only to be loaded into one computer entity to be available to all computer entities in the group. To improve efficiency of operation of the DFS based data protection method, some types of file, for example operating system files which are common to a plurality of computer entities need only be stored in the DFS backup system once, with pointers to individual computer entities.

The second method recognizes that distributed file systems can be used for data protection, which is a purpose for which they are not designed for in the prior art to achieve benefits of reduced cost of ownership of a plurality of computer entities, by reuse of otherwise unused non-volatile data storage areas and enabling any computer entity within a data protection group selected by a user, which contributes to a distributed file system, to recover their data without having to load other media, and wait for user initiated commands.

What is claimed is:

1. A network of computers comprising:
    a plurality of individual computer devices each having a non-volatile data storage device, and each of the computer devices being arranged for communicating with at least one other one of said plurality of computers;
    each said non-volatile data storage device being divided into a first data storage area reserved for files to be used by the at least one processor of the corresponding computer device for its normal operation and which is inaccessible to other processors outside the individual computer device except via the at least one processor of the computer entity, and a second data storage area reserved for backup storage of data included in at least one said first data storage area of at least one other said non-volatile data storage device;
    a data protection component for providing data protection for user data stored on each of the non volatile data storage devices by storing the user data which is resident within the said first data storage area of each non volatile data storage device, in one or a plurality of said second data storage areas of other said non volatile data storage devices.

2. The network of computers as claimed in claim 1, comprising a set-up component for defining said data storage devices into a data protection group in which data from each of the plurality of data storage devices in the group are distributed amongst the plurality of data storage devices in the group.

3. The network of computers as claimed in claim 1, comprising:
    a sizer configured for selecting a size of a first and a second data storage area of each of said plurality of non-volatile data storage devices.

4. The network of computers as claimed in claim 1, further comprising a finder for finding a plurality of non volatile data storage devices.

5. The network of computers as claimed in claim 1, further comprising;
    a selector for selecting individual ones of said plurality of non volatile data storage devices.

6. The network of computers as claimed in claim 1, comprising:
    a scheduler for scheduling copying of data between individual ones of said plurality of non-volatile data storage devices.

7. The network of computers as claimed in claim 1, comprising:
    a mode selector for selecting between a distributed mode of data copying, in which data of each of a plurality of said first data areas is adapted to be copied to a plurality of said second data areas, and a redundant mode in which data of each said first data storage area is adapted to be copied to said second data storage areas of all of the other ones of plurality of non-volatile data storage devices.

8. A computer entity comprising:
    at least one data processor;
    at least one non volatile data storage device being divided into a first data storage area as a reserve for files to be used by data of said computer entity, and a second data storage area reserved for storage of data included in at least one other computer entity; and a data protection component for providing data protection for user data of said at least one other computer entity.

9. The computer entity as claimed in claim 8, further comprising:

at least one network port;

a data transferor component for sending a copy of said data stored in said first data storage area to said network ports.

10. The computer entity as claimed in claim 8, further comprising:

a finder component for finding at least one other non volatile data storage device.

11. The computer entity as claimed in claim 10, further comprising:

a selector component for selecting at least one individual one of a plurality of unrelated non volatile data storage devices.

12. The computer entity as claimed in claim 10, wherein said data storage device is arranged for causing said second data storage area to store data relating to a plurality of other computing entities in striped distributed format.

13. The computer entity as claimed in claim 10, wherein said data storage device is arranged for causing said second data storage area to store, in a plurality of partitions, a plurality of individual blocks of data each relating to a corresponding respective other computer entity such that data of each said other computing entity is stored in a corresponding respective one of said partitions.

14. A method of data protection in a network of computer entities comprising a plurality of individual computer entities, each having a data processor, and at least one non-volatile data storage device, and each of the computer entities being arranged for communicating with at least one other of said plurality of computer entities, said method comprising, for each said computer entity, the steps of:

dividing a said non-volatile data storage device of said computer entity into a first data storage area, and a second data storage area;

assigning said first data storage area for use in storing data for the operation of a corresponding said respective said data processor; and assigning said second data storage area for storage of data by at least one other said computer entity.

15. The method as claimed in claim 14, further comprising, for each said second data storage area, the step of:

partitioning said second data storage area into a plurality of partitions; and assigning each said partition for storing data specific to a corresponding respective other one of said plurality of computer entities.

16. A method of data protection in a network of computer entities, each said computer entity comprising at least one data processor and at least one non-volatile data storage device, each said non-volatile data storage device being divided into a first data storage area dedicated for use by a said corresponding respective computer entity, and a second data storage area dedicated for use in storing data of at least one other one of said plurality of computer entities, said method comprising the steps of:

searching said network of computer entities to find at least one non-volatile data storage device and selecting individual ones of said at least one non-volatile data storage devices; and copying data stored in a first said data storage area of a first said non-volatile data storage device into a second said data storage area of a second said non-volatile data storage device.

17. The method as claimed in claim 16, wherein each said second data storage area is arranged into a plurality of partition areas, and each partition area of an individual said second data storage area is assigned to store data of a corresponding respective other said data storage device.

18. The method as claimed in claim 16, wherein, for each of said plurality of computer entities:

data stored in a said first data storage area of said at least one data storage device of said computer is replicated and stored in a plurality of second data storage areas of a plurality of other said computer entities within said network.

19. The method as claimed in claim 16, wherein:

each said computer entity writes a write data to its corresponding said at least one data storage device;

upon a said computer entity writing a said write data, said computer entity sends a copy of said write data to at least one other computer entity of said plurality of computer entities in said network; and said at least one other computer entity stores said write data in a second data storage area of a said data storage device of said other computer entity.

20. The method as claimed in claim 16, wherein:

data stored in a first said data storage area of a first computer entity is stored as a stripe in a plurality of said second data storage areas of a plurality of other ones of said computer entities comprising said network.

21. A method of data protection in a computer entity comprising at least one data processor, at least one non-volatile data storage device, and a network port, said data storage device being divided into a first data storage area dedicated for files used by said at least one processor for its normal operation and which is inaccessible to other processors outside the individual computer entity except via the at least one processor of the computer entity, and a second data storage area dedicated for use in storing data unrelated to said processor, said method comprising the steps of:

finding a plurality of other non-volatile data storage devices of other computer entities and selecting individual other said non-volatile data storage devices;

receiving via said network port a said data unrelated to said processor; and storing said received data in said second data storage area of said non-volatile data storage device.

22. The method as claimed in claim 21, wherein:

said received data comprises data of a plurality of different other computer entities;

said second data storage area is arranged into a plurality of different partitions; and said step of storing said received data comprises:

storing received data of each of said other computer entities in a corresponding respective said partition.

23. The method as claimed in claim 21, wherein:

said received data comprises incremental backup data of at least one other computer entity, said incremental backup data comprising files which have been rewritten to be different on said first data storage area compared to at least one corresponding file in a said second data storage area.

24. The method as claimed in claim 21, wherein said received data comprises a write data sent by at least one other computer entity in response to a plurality of write events occurring locally on said other computer entity.

* * * * *